2,835,703
HYDRAZIDES OF ALLYLOXAMIC ACID

John R. Caldwell and Winston J. Jackson, Jr., Kingsport, Tenn., assignors to Eastman Kodak Company, Rochester, N. Y., a corporation of New Jersey No Drawing. Application April 18, 1956
Serial No. 578,898

6 Claims. (Cl. 260—561)

This invention relates to hydrazides of allyloxamic acid and to a process for their preparation.

The new compounds of the invention are represented by the following general structural formula:

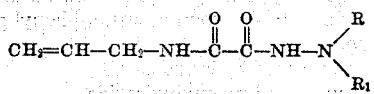

wherein R and $R_1$ each represents a hydrogen atom, an alkyl group containing from 1 to 4 carbon atoms or an aryl group containing from 6 to 7 carbon atoms e. g. methyl, ethyl, propyl, isopropyl, n-butyl, phenyl, p-tolyl, o-tolyl, etc. groups. The new compounds of the invention above defined are useful as insecticides and herbicides and are also valuble as intermediates for preparing resinous copolymers with other polymerizable unsaturates containing a —CH=C< group. Such resinous copolymers are soluble in one or more common organic solvents such as acetone, ethyl acetate, cyclohexanone, etc. and those copolymers containing a major proportion of acrylonitrile are soluble in solvents such as dimethylformamide, dimethylacetamide, γ-butyrolactone, dimethylsulfolane, etc., from which solutions they can be readily spun into fibers having good affinity for various organic dyes. For further details of the use of the above defined compounds of our invention for preparing resinous copolymers, reference may be had to copending application Serial No. 578,897 of John R. Caldwell and Edward H. Hill, filed of even date herewith.

It is, accordingly, an object of the invention to provide the above defined new class of nitrogen containing unsaturates. Another object is to provide a process for preparing the same. Other object will become apparent from the description and examples.

In accordance with the invention, we prepare the new monomeric compounds by reacting an alkyl allyloxamate with a hydrazine compound, in approximately equimolar proportions, but preferably with a slight excess of the hydrazine compound, at a temperature of from 30° to 180° C., and separating the product which forms by conventional methods, for example, by cooling the mixture to cause crystallization of the product, collecting the crystals and obtaining the pure compound by recrystallization from suitable organic solvents such as ethanol, isopropanol, dioxane, etc. In some cases, the reaction may advantageously be carried out in an inert liquid medium, for example, in an alkanol such as methanol or ethanol. Suitable intermediate alkyl allyloxamates include those wherein the alkyl group contains from 1 to 4 carbon atoms, for example, methyl allyloxamate, ethyl allyloxamate, isopropyl allyloxamate, n-butyl allyloxamate, etc. These may be prepared by reacting allylamine with an oxalic acid dialkyl ester [Beilstein, 4th ed., vol. 3–4, page 391 (1929)] and separating the product by vacuum distillation. Suitable intermediate hydrazine compounds include hydrazine hydrate, alkyl and arylhydrazines wherein the alkyl group contains from 1 to 4 carbon atoms and the aryl group contains from 6 to 7 carbon atoms, for example, methylhydrazine, 1,1-dimethylhydrazine, n-butylhydrazine, 1-methyl-1-isopropylhydrazine, o-tolylhydrazine, p-tolylhydrazine, 1-methyl-1-p-tolylhydrazine, phenylhydrazine, 1,1 - diphenylhydrazine, 1 - methyl - 1 - phenylhydrazine, etc.

The following examples will serve to illustrate further our new monomeric compounds and the method for their preparation.

Example 1

To 25 g. (approx. 0.16 mol.) of ethyl allyloxamate ($CH_2$=$CHCH_2NHCOCOOC_2H_5$) in 150 cc. of ethanol, there were added 10 g. (0.20 mol.) of hydrazine hydrate. The reaction was exothermic and the product crystallized immediately. This was collected and washed with ethanol; yield 22 g., M. P. 161°–163° C. of crude product. Recrystallization from dioxane yielded tiny white platelets, M. P. 167°–168° C. Analysis of the purified crystals showed by weight 42.11% of carbon, 6.38% of hydrogen and 29.04% of nitrogen compared with calculated theory for allyloxamic acid hydrazide

of 42.0%, 6.3% and 29.3%, respectively. This result indicated that substantially pure allyloxamic acid hydrazide had been obtained. It was readily copolymerizable with a major proportion of acrylonitrile to give a resinous copolymer useful for molding into shaped objects and spinnable from solvents such as dimethylformamide to dyeable fibers.

Example 2

A mixture of 29 g. of ethyl allyloxamate and 21 g. of phenylhydrazine was heated in a metal bath at 160° C. for a period of 2 hours. The product solidified on cooling. Recrystallization from ethanol yielded 32 g. of allyloxamic acid phenylhydrazide

M. P. 174°–175° C. Analysis showed that the product contained 18.9% by weight of nitrogen compared with calculated for $C_{11}H_{13}N_3O_2$ of 19.2% by weight of nitrogen. The product had similar utility as the product of Example 1.

Example 3

A mixture of 36 g. of ethyl allyloxamate and 15 g. of 1,1-dimethylhydrazine was heated on a steam bath for a period of 2 hours. The product solidified during this time. Recrystallization from a small amount of ethanol yielded 32 g. of feathery white needles of allyloxamic acid dimethyl hydrazide $$[CH_2=CHCH_2NHCOCONHN(CH_3)CH_3]$$

M. P. 147°–148° C. Analysis showed that the product contained 24.42% by weight of nitrogen compared with calculated for $C_7H_{13}N_3O_2$ of 24.6% by weight of nitrogen.

Example 4

17 g. of n-butylhydrazine were heated with 25 g. of ethyl allyloxamate on a steam bath for a period of 2 hours. The product, allyloxamic acid n-butylhydrazide

recrystallized from ethanol was obtained in a yield of 77% of allyloxamic acid n-butylhydrazine. Analysis showed that the product contained 21.2% by weight of nitrogen compared with calculated for $C_9H_{17}N_3O_2$ of 21.1% by weight of nitrogen.

Example 5

A mixture of 25 g. of ethyl allyloxamate and 17 g. of 1-methyl-1-isopropylhydrazine was heated on a steam bath for a period of 4 hours. Recrystallization of the crude product yielded 24 g. of allyloxamic acid methyl, ispropylhydrazide [CH$_2$=CHCH$_2$NHCOCONHN(CH$_3$)C$_3$H$_7$]. Analysis showed that the product contained 20.9% by weight of nitrogen compared with calculated for $$C_9H_{17}N_3O_2$$

of 21.1% by weight of nitrogen.

*Example 6*

29 g. of ethyl allyloxamate were heated with 27 g. of 1-methyl-1-p-tolylhydrazine in a metal bath at 160° C. for a period of 2 hours. The product, allyloxamic acid methyl, p-tolylhydrazide

[CH$_2$=CHCH$_2$NHCOCONHN(CH$_3$)C$_6$H$_4$CH$_3$]

after two recrystallizations from dioxane, was obtained in a yield of 68%. Analysis showed that it contained 16.9% by weight of nitrogen compared with calculated for $$C_{13}H_{17}N_3O_2$$

of 17.0% by weight of nitrogen.

In place of the 1-methyl-1-p-tolylhydrazine, there may be substituted an equivalent amount of 1,1-di-p-tolylhydrazine to give the corresponding allyloxamic acid di-p-tolyhydrazide.

*Example 7*

29 g. of ethyl allyloxamate and 36 g. of 1,1-diphenylhydrazine were heated together in a metal bath at 160° C. for a period of 4 hours. The crude crystalline product was recrystallized from ethanol to give a yield of 29 g. of the product, allyloxamic acid diphenylhydrazide

[CH$_2$=CHCH$_2$NHCOCONHN(C$_6$H$_5$)C$_6$H$_5$]

Analysis showed that it contained 14.1% by weight of nitrogen compared with calculated for C$_{17}$H$_{17}$N$_3$O$_2$ of 14.2% by weight of nitrogen.

In place of the 1,1-diphenylhydrazine, there may be substituted an equivalent amount of 1-methyl-1-phenylhydrazine to give the corresponding allyloxamic acid methyl phenylhydrazide.

By proceeding as set forth in the above example, similar products can be prepared employing any other of the mentioned intermediate alkyl allyloxamates and alkyl and arylhydrazines. When used as insecticides and herbicides, the allyloxamic acid hydrazides of the invention are customarily dispersed in an appropriate solvent medium and usually applied in the form of a spray.

What we claim is:

1. Allyloxamic acid hydrazides represented by the following general formula:

$$CH_2=CH-CH_2-NH-\overset{O}{\underset{\|}{C}}-\overset{O}{\underset{\|}{C}}-NH-N\begin{matrix}R\\R_1\end{matrix}$$

wherein R and R$_1$ each represents a member selected from the group consisting of a hydrogen atom, an alkyl group containing from 1 to 4 carbon atoms, a phenyl group and a tolyl group.

2. Allyloxamic acid hydrazide.
3. Allyloxamic acid phenylhydrazide.
4. Allyloxamic acid dimethylhydrazide.
5. Allyloxamic acid n-butylhydrazide.
6. Allyloxamic acid diphenylhydrazide.

References Cited in the file of this patent

UNITED STATES PATENTS

| | | |
|---|---|---|
| 2,416,234 | Stillman et al. | Aug. 28, 1945 |
| 2,470,160 | Gertler | July 19, 1946 |